United States Patent
Gabel

[15] 3,669,167
[45] June 13, 1972

[54] SAUSAGE SLICING APPARATUS
[72] Inventor: Floyd S. Gabel, 5008 N.W. Steanson, Oklahoma City, Okla. 73112
[22] Filed: Aug. 5, 1970
[21] Appl. No.: 61,202

[52] U.S. Cl. .................................................146/98
[51] Int. Cl. ...............................................B26d 1/28
[58] Field of Search.....................................146/98

[56] References Cited

UNITED STATES PATENTS

| | | | |
|---|---|---|---|
| 1,937,264 | 11/1933 | Criner et al.............................. | 146/98 |
| 3,349,822 | 10/1967 | Rauth .................................. | 146/98 X |
| 2,318,897 | 5/1943 | Spang .................................. | 146/98 X |
| 3,535,576 | 11/1967 | Cooper.................................. | 146/98 X |

Primary Examiner—Willie G. Abercrombie
Attorney—Dunlap, Laney, Hessin & Dougherty

[57] ABSTRACT

A sausage slicing apparatus which includes a conveyor for horizontally moving an elongated package of sausage in a horizontal direction while supporting the sausage in a cradle. A plurality of banks of rotary driven, disk-shaped cutter blades which are horizontally offset or staggered to sequentially engage the sausage package are provided in a position to cut through portions of the sausage package in sequence, with minimum power required to effect complete cutting of the entire sausage package into patties or sausage disks. Stripper fingers are provided and extend between adjacent disk-shaped cutter blades of the apparatus for preventing the adherence to the blades of fatty materials from the sausage, and consequent plugging of the blades and an increase in power requirements of the apparatus.

4 Claims, 4 Drawing Figures

INVENTOR
FLOYD S. GABEL

INVENTOR
FLOYD S. GABEL

BY
Dunlap, Laney, Hessin & Dougherty
ATTORNEYS

SAUSAGE SLICING APPARATUS

BACKGROUND OF THE INVENTION

This invention relates to cutting machines for cutting a cylindrically shaped package into a plurality of juxtapositioned disks. More specifically, the present invention relates to a sausage cutting machine for cutting an elongated, generally cylindrical sausage package into a plurality of sausage patties in an expeditious manner and with a low power requirement.

BRIEF DESCRIPTION OF THE PRIOR ART

Various machines have previously been proposed for cutting loaves of bread into slices, cutting elongated tubular tobacco packages into individual cigarettes, and various other operations which generally and in common entail the horizontal passage of an elongated cylindrical package of material, or cylindrical food stuff of some type, through a plurality of disk-shaped cutter blades to form slices or small disk-shaped individual pieces for purposes of final packaging, storage, or consumption.

In general, elongated packages of sausage which are confined in a skin and are of generally cylindrical configuration have not been susceptible to satisfactory slicing with apparatus of the type described, but have rather been subdivided into patties by other types of apparatus requiring more time, and a greater capital investment than slicing machines of the type described. A problem which has been encountered in attempts to adapt the disk-shaped blade series to the cutting of sausage moved horizontally through the blades has resulted from the sticky or adhesive character of sausage meat which, as is well known, contains a significant amount of fat which increases the tackiness of the sausage, and permits particles of the sausage to adhere to the blades, and cause them to become fouled or clogged over short periods of usage.

In my co-pending U.S. application Ser. No. 861,771 entitled "Powered Cutter Apparatus" filed Sept. 29, 1969, I have described a sausage slicing machine which undertakes to efficiently slice an elongated package of sausage into patties or slices without encountering the problem posed by the high fat content, and high degree of tackiness of the sausage. The problem of adherence of bits and pieces of the sausage to the rotating cutter blades is overcome in the machine described in my co-pending application by providing stripper fingers between the several cutter blades so that these blades are continuously wiped clean, and bits and pieces of the sausage are not permitted to become lodged between the blades and to build up to an extent such that the blades are clogged,

BRIEF DESCRIPTION OF THE PRESENT INVENTION

The present invention provides an improved sausage slicing machine employing a plurality of horizontally aligned, disk-shaped cutter blades through which a package of sausage is passed horizontally in order to provide disks or slices of the sausage suitable for immediate serving and consumption. The invention constitutes an improvement in several respects over the slicing apparatus described in my co-pending application, but a salient improvement resides in the construction of the apparatus to reduce the drag imposed on the cutter blades by the sausage package passed therethrough, and thus to reduce the power requirements for operating the apparatus.

Broadly described, the sausage slicing or cutting apparatus of the present invention comprises a framework which carries at the upper side thereof a horizontally extending conveyor assembly which, in a preferred embodiment of the invention, constitutes one or more endless belts passed over suitable rollers or pulleys, and carrying one or more cradles which are adapted to carry and support an elongated, generally cylindrically shaped sausage package. The upper run of the conveyor is positioned adjacent the lowermost portion of a plurality of vertically extending, disk-shaped cutter blades. The cutter blades are arranged over the upper run of the conveyor in three banks or sets, each of which contains a plurality of horizontally aligned blades, with the sets being horizontally offset so that the blades in each set are sequentially encountered by the sausage package moved horizontally on the conveyor. The blades are keyed to horizontally extending shafts which are driven in rotation for the purpose of rotating the blades to enable them to cut through the sausage package. The shafts to which the blades are keyed are mounted in a superstructure which is secured to the upper side of the framework, and which further acts as support for a plurality of horizontally extending structural members which act as support elements for a plurality of stripper fingers which extend downwardly between adjacent pairs of cutter blades. The stripper fingers are dimensioned and configured to provide a wiping action in respect to the adjacent cutter blades, and thus to prevent bits and pieces of the sausage from adhering to the cutter blades during this rotation. Suitable means is provided for driving the conveyor assembly, and for driving the cutter blades in rotation.

An important object of the invention is to provide an improved sausage slicing apparatus which can quickly and efficiently slice an elongated, generally cylindrical package of sausage into relatively thin patties suitable for serving and consumption.

Another object of the invention is to provide a sausage cutting apparatus which can quickly subdivide an elongated cylindrical package of sausage meat into a plurality of patties without a large power requirement for driving the blades which cut through the sausage.

An additional object of the invention is to provide an improved sausage cutting apparatus which can cut a loaf or elongated package of sausage into a plurality of patties quickly and easily without the blades performing such cutting becoming fouled by the fatty content of the sausage, or by bits and pieces of the sausage adhering to and becoming impacted between the blades.

Yet another object of the invention is to provide a sausage slicing apparatus which is sturdily constructed and is characterized in having a long and trouble-free operating life.

Additional objects and advantages of the invention will become apparent as the following detailed description of the invention is read in conjunction with the accompanying drawings which illustrate the invention.

DETAILED DESCRIPTION OF A PREFERRED EMBODIMENT OF THE INVENTION

Figure 1:
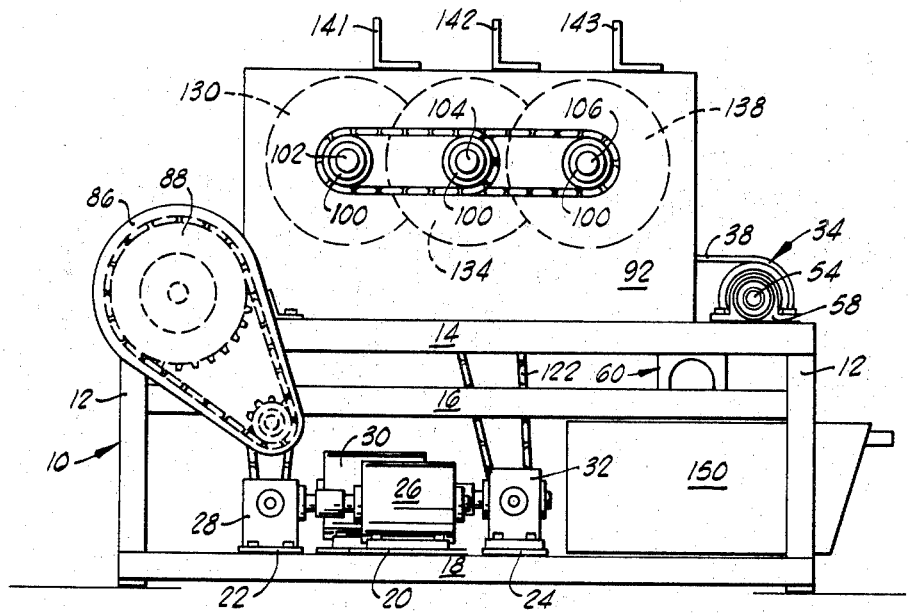
FIG. 1 is a side elevation view of the sausage slicing apparatus of the invention with certain obscured portions shown in dashed lines to depict their location in relation to overlying obscuring portions.

Referring initially to the drawings, and particularly to FIG. 1, a framework 10 includes vertically extending frame members 12 which support horizontally extending frame members 14. Horizontal brace members 16 extend between the vertically extending frame members 12 below the horizontally extending frame members 14. There are also provided horizontally extending base members 18 which support transverse plates 20, 22, and 24. The plate 20 supports a drive motor 26 which, through suitable shafting, drives a gear reducer 28 for a purpose hereinafter described. The plate 20 also supports a motor 30 which, through suitable shafting, drives a gear reducer 32 mounted on the support plate 24.

Mounted on the upper side of the framework 10 is a conveyor assembly designated generally by reference numeral 34. The conveyor assembly 34 includes a pair of endless, horizontally extending belts 36 and 38 which extend over rollers or pulleys 40 and 42 (in the case of the belt 36) and 44 and 46 (in the case of the belt 38). The endless belts 36 and 38 extend longitudinally of the framework 10 and each includes an upper run and a lower run.

Figure 2:
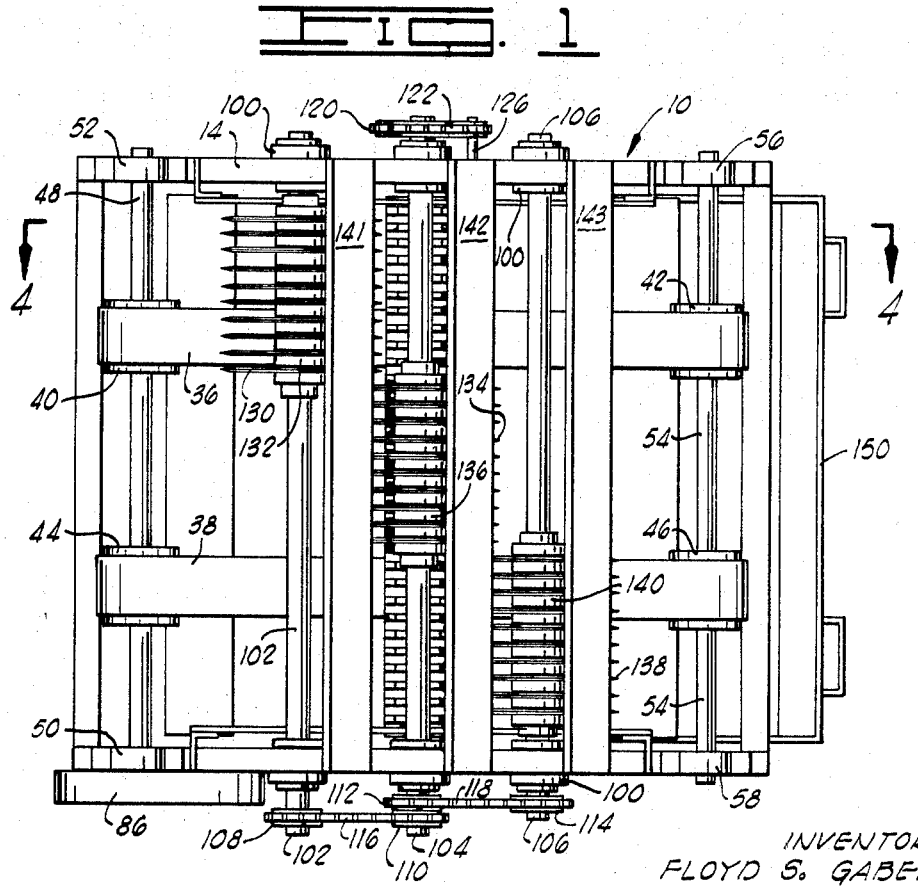
FIG. 2 is a plan view of the apparatus depicted in FIG. 1.

The rollers 40 and 44 are mounted upon, and keyed to, a drive shaft 48 which has its opposite ends journaled in suitable bearing blocks 50 and 52 (see FIG. 2). The bearing blocks 50 and 52 are bolted or otherwise suitably secured to the horizontally extending frame members 14 at one end of the framework 10. The rollers 42 and 46 are keyed to a shaft 54 which has its opposite ends journaled in bearing blocks 56 and 58 bolted or otherwise suitably secured to the horizontal frame members 14 at the opposite end of the framework 10 from the bearing blocks 50 and 52.

Extending across and secured to the endless belts 36 and 38 in a direction substantially normal thereto are a plurality of cradles 60. The cradles 60 are identically constructed, and each includes a transversely extending plate 62 which is of a length to extend transversely across the framework 10 and which is secured at two points spaced along its length to the upper runs of the belts 36 and 38. Each of the cradles 60 further includes a plurality of bifurcated supporting plates 64 which are horizontally aligned, and have a base or web portion secured to the plates 62 each of said bifurcated plates having an upwardly opening U-shaped recess therein, with the bottom of said U-shaped recess being rounded for receiving a circularly cross-sectioned elongated, generally cylindrical package of sausage. The supporting plates 64 are relatively thin to permit them to pass between adjacent, horizontally aligned cutting blades as hereinafter explained, and the supporting plates are horizontally aligned so as to collectively form an elongated channel in which an elongated, generally cylindrical package of sausage may be placed for slicing by the apparatus of the invention. In the embodiment of the invention depicted in the drawings, three of the cradles 60 are provided in the conveyor assembly 34, and it will be perceived that the cradles are spaced from each other along the total length of the endless belts 36 and 38 by a substantial distance which, as will be hereinafter explained, affords adequate spacing between the cradles to permit each cradle to complete a traversal of the cutting blades of the apparatus before traversal of these blades is commenced by the next succeeding cradle.

For the purpose of driving the conveyor assembly 34, a sprocket 70 is keyed to an output shaft 72 from the gear reducer 28 and engages a chain 74 which extends upwardly around another sprocket 76 keyed to a shaft 78. The shaft 78 is journaled in a suitable bearing block 80 mounted on the intermediate frame member 16, and extends through this bearing block and carries at the outer side of the frame, a second sprocket 82 which engages a drive chain 84. The sprocket 82 and drive chain 84 are covered by a suitable guard housing 86, and this guard housing also encloses a large sprocket 88 which is keyed to a portion of the drive shaft 48 which projects through the bearing block 50. Thus, through the described kinematic chain, the motor 26 drives the drive shaft 48 in rotation and this in turn causes the endless belts 36 and 38 to be driven by frictional engagement with the rollers 40 and 44.

Figure 3:
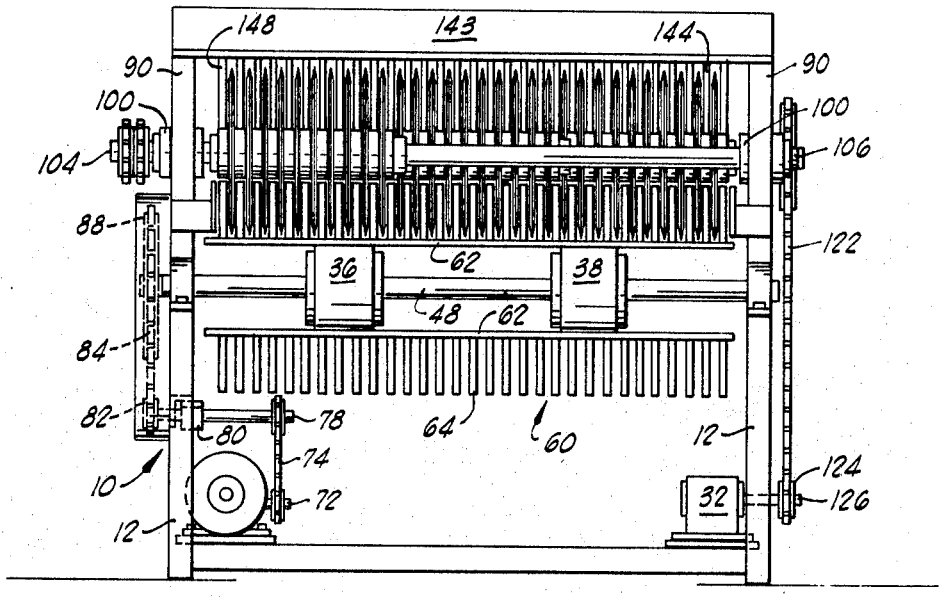
FIG. 3 is an end elevation view of the apparatus depicted in FIG. 1.
Figure 4:
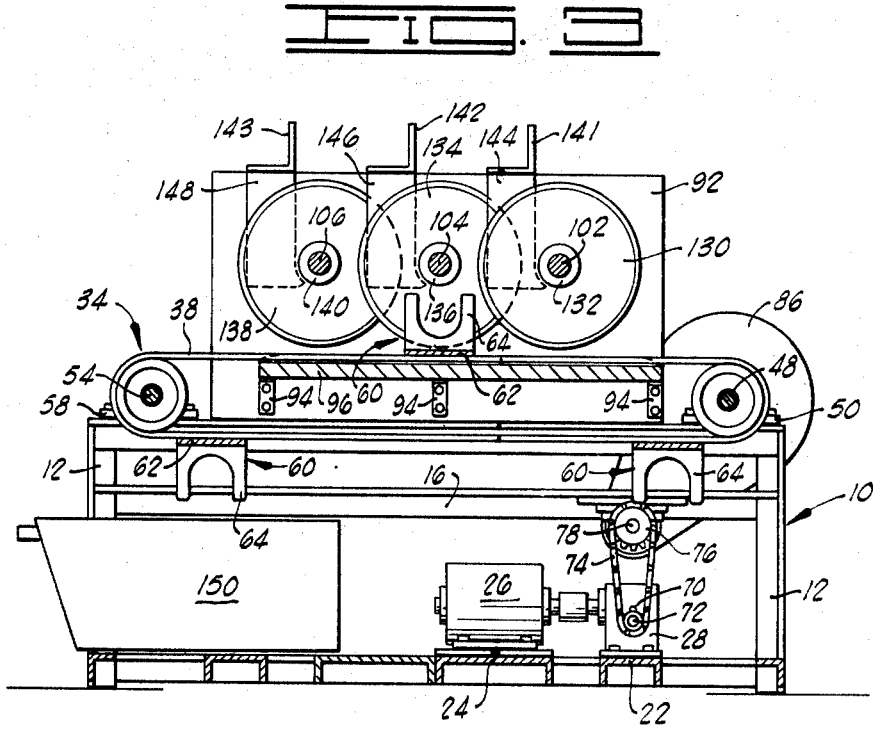
FIG. 4 is a sectional view taken along the line 4—4 of FIG. 2.

Mounted on the upper side of the framework 10 is a superstructure which includes a plurality of vertical support members 90 (see FIG. 3). Vertically extending side plates 92 are secured between the support members 90 in alignment with opposite sides of the framework 10, and generally function to support the cutter blades, stripper plates, and belt support plate hereinafter described.

A plurality of brackets 94 are secured to the lower portion of the side plates 92 in longitudinally spaced relation therealong, and function for mounting a belt support plate 96 which extends transversely of the framework 10 and beneath the central portion of the upper run of each of the endless belts 36 and 38. The belt support plate 96 functions to prevent sagging of the belts due to a downward force applied thereto as the sausage package to be cut into slices or patties is subjected to the cutting action of the cutter blades hereinafter described.

Mounted in the intermediate portion of each of the side plates 92 and longitudinally spaced therealong are a plurality of bearing blocks 100. In the illustrated embodiment of the invention, three of the bearing blocks 100 are mounted in each of the side plates 92, with pairs of bearing blocks on opposite sides of the superstructure being horizontally aligned to journal the opposite ends of three shafts. Thus, a shaft 102 extends through one pair of bearing blocks, a shaft 104 extends through and is journaled in a second pair of bearing blocks, and a shaft 106 extends through and is journaled in a third pair of the bearing blocks. As best illustrated in FIGS. 1 and 2, the shaft 102 carries at one of its ends, a sprocket 108, and at a corresponding end of the shaft 104, sprockets 110 and 112 are axially aligned and keyed to the shaft. A sprocket 114 is carried by the shaft 106 at its end corresponding to the ends of the shafts 102 and 104 which carry the sprockets 108, 110 and 112. The several shafts 102, 104 and 106 are drivingly interconnected by means of chains 116 and 118 which drivingly engage the sprockets 102 and 110, and 112 and 114, respectively.

At the end of the shaft 104 which is opposite its end carrying the sprockets 110 and 112, this shaft carries a drive sprocket 120 which is disposed on the opposite side of the framework from the sprockets 110 and 112, and which drivingly engages a drive chain 122. The drive chain 122 extends downwardly, as best illustrated in FIG. 3, to a sprocket 124 which is keyed to an output shaft 126 extending from the gear reducer 32. As previously described, the gear reducer 32 is driven from the motor 30.

Each of the shafts 102, 104 and 106 carries keyed thereto a plurality of disk-shaped cutter blades. These blades are substantially identical in size, and those disk-shaped cutter blades carried by the shaft 102 are designated by reference numeral 130. The cutter blades 130 are spaced from each other by suitable spacer elements 132 and are, as shown in FIG. 2, disposed near one end of the shaft 102 for a purpose hereinafter described. As the shaft 102 is driven in rotation, the cutter blades 130 are also driven in rotation.

At a central or intermediate portion of the shaft 104, a second group or bank of the disk-shaped cutter elements are located and are keyed to this shaft for rotation therewith. The cutter blades keyed to the shaft 104 are designated by reference numeral 134 and are spaced by suitable spacer elements 136. Finally, a third group or bank of disk-shaped cutter blades 138 is keyed to the shaft 106 and these blades are disposed on the opposite side of the framework from the blades 130 keyed to the shaft 102. The blades 138 are spaced from each other by spacer elements 140.

Extending across the top of the superstructure which is mounted upon the framework 10, and resting upon the opposed side plates 92 are a plurality of supporting beams 141, 142 and 143. The supporting beams 141, 142 and 143 have welded to the under side of the horizontally extending flange thereof a plurality of downwardly depending stripper fingers. These stripper fingers have a thickness such that each finger extends between an adjacent pair of disk-shaped cutter blades previously described. The stripper fingers are arranged in banks corresponding to the cutter blades, with those stripper fingers depending from the supporting beam 141 and positioned between the cutter blades 130 being denominated by reference number 144. The stripper fingers which depend from the beam 142 and extend between the cutter blades 134 are designated by reference numeral 146. The stripper fingers 148 in the last bank extend between the cutter blades 138 and are secured to the supporting beam 143.

It will be noted that adjacent the lower edge of each of the stripper fingers 144, 146 and 148 in each of the banks, each stripper finger carries a toe which projects inwardly and beneath the adjacent spacer element on the shaft upon which its associated cutter blades are mounted. The toes of the stripper fingers function to prevent the ingress of bits of meat between the stripper fingers and the spacer elements used to space the rotary cutter blades from each other.

A final and optional element of the sausage slicing apparatus of the invention is a bin 150 which is disposed beneath the framework 10 at the discharge end of the conveyor assembly 34. The bin 142 has an open upper side for receiving sausage which has been sliced by passage through the apparatus for subsequent disposition by packaging the slices or patties. It should be pointed out that in lieu of the bin 150, an additional conveyor assembly may be provided for conveying the sausage slices or patties to a remote location for packaging or disposition as may be desired.

OPERATION

In the operation of the apparatus of the invention, an elongated generally cylindrical package of sausage is placed in one of the cradles 60 as the conveyor assembly 34 is driven from the motor 26. Each cradle assembly 60 is carried by the endless belts 36 and 38, and when one of the cradle assemblies passes around the rollers 40 and 44 disposed at one end of the framework 10, an operator places the sausage package in the elongated channel formed by the several supporting plates 64. The sausage package in the cradle is moved by the conveyor assembly 34 through the several banks of disk-shaped cutter blades, with the package first encountering the blades 130 carried on the shaft 102. Here the left hand portion of the package (considered in terms of the direction of travel) is first cut through by the aligned cutter blades 130 to form a plurality of juxtapositioned patties. Since the cutter blades 130 are cutting through only a portion of the elongated package rather than the entire package, the power requirement for cutting through the sausage is substantially reduced. As the package passes through the blades 130, the blades tend to pick up small bits of meat and fat which adhere to the blades as a result of the sticky characteristic of the meat composition of sausage. These bits of meat and fat are stripped from the blades by the stripper fingers 144 which extend between adjacent blades and in close proximity to the blades on each side thereof so as to perform a wiping and cleaning action.

After the sausage package has been carried in the cradle 60 through the bank of blades 130, it encounters the blades 134 carried on the shaft 104. These blades cut through a central portion of the sausage package to subdivide this portion of the package into patties or slices. Again, the wiping action of the stripper fingers 146 wipes away bits of meat which adhere to the cutter blades 134, and prevents these blades from becoming clogged or jammed with accumulated fat and bits of meat. It will also be noted that again only a portion of the total sausage package is being cut by the bank of blades 134, and the power requirement is thus significantly lowered.

Finally, the sausage package is carried by the cradle 60 through the last bank of blades 138 and again is cut into patties. The stripper blades 148 function at this point to clean the blades in the manner previously described, and the slicing of the entire sausage package into patties is completed. After transiting the upper run of the conveyor assembly 34 in one of the cradles 60, the patties are deposited in the bin 150 as the cradle in which the package has been located passes around the rollers 42 and 46.

Although a preferred embodiment of the invention has been herein described, various changes and modifications in the illustrated and discussed structure can be effected without departure from the basic principles of the invention. Changes and innovations of this type and therefore deemed to the circumscribed by the spirit and scope of the invention except as the same may be necessarily limited by the appended claims or reasonable equivalents thereof.

What is claimed is:

1. Sausage slicing apparatus comprising:
   a framework;
   a horizontally extending conveyor assembly mounted on said framework for moving a sausage package through a horizontal path, said conveyor assembly comprising:
   at least two endless, flexible members each having a horizontally extending upper run and a horizontally extending lower run;
   a plurality of cradles secured to said flexible members for movement therewith and extending substantially normal to the upper and lower runs of said flexible members, each of said cradles comprising:
   an elongated, transversely extending plate extending across, and connected to, said flexible members; and
   a plurality of bifurcated plates secured to each of said transversely extending plates and each having a U-shaped recess therein, with each of said recesses having a rounded bottom for receiving a cylindrically shaped sausage package;
   disc-shaped cutter blades positioned over said conveyor assembly and arranged in banks horizontally offset from each other along said conveyor assembly for sequentially contacting a sausage moved by said conveyor assembly, said banks of cutter blades each being transversely offset with respect to each of the other of said banks in respect to the direction of travel of said flexible members of said horizontally extending conveyor assembly;
   stripper fingers mounted on said framework and extending vertically between said cutter blades for continuously cleaning said blades during operation of said apparatus, said stripper fingers each having a straight, substantially horizontally extending lower end spaced upwardly from said conveyor assembly and positioned to cooperate with the bifurcated plates of said cradles to close the U-shaped recesses therein as the cradles are passed beneath said stripper fingers; and
   means for driving all of said blades in the same direction of rotation, and in a direction of rotation which corresponds to the direction of movement of the upper arms of said endless flexible members of said conveyor assembly.

2. A sausage slicing apparatus as defined in claim 1 wherein the endless flexible members of said conveyor assembly each comprises an elongated endless belt; and
   wherein said conveyor assembly further includes:
   rollers supporting the opposite ends of said belts; and
   means for driving in rotation, rollers contacting each of said belts.

3. A sausage slicing apparatus as defined in claim 2 and further characterized as including a belt support plate extending across said framework immediately beneath the central portion of the upper run of each of the endless belts.

4. A sausage slicing apparatus as defined in claim 1 wherein there are three banks of said cutter blades, and said apparatus is further characterized as including
   a superstructure mounted on said framework;
   a first shaft extending across said superstructure and having the cutter blades in one of said banks keyed thereto;
   a second shaft extending across said superstructure at a location spaced horizontally from said first shaft and having the cutter blades in another of said banks keyed thereto; and
   a third shaft extending across said superstructure at a location spaced from said first and second shafts and having the cutter blades of another of said banks keyed thereto.

* * * * *